United States Patent
Won et al.

(10) Patent No.: US 7,992,202 B2
(45) Date of Patent: Aug. 2, 2011

(54) APPARATUS AND METHOD FOR INPUTTING GRAPHICAL PASSWORD USING WHEEL INTERFACE IN EMBEDDED SYSTEM

(75) Inventors: Dongho Won, Suwon-si (KR); Sangjoo Park, Suwon-si (KR); Seungjoo Kim, Suwon-si (KR)

(73) Assignee: SUNGKYUNKWAN University Foundation for Corporate Collaboration (KR)

( * ) Notice: Subject to any disclaimer, the term of this patent is extended or adjusted under 35 U.S.C. 154(b) by 787 days.

(21) Appl. No.: 12/009,243

(22) Filed: Jan. 17, 2008

(65) Prior Publication Data

US 2009/0172810 A1    Jul. 2, 2009

(30) Foreign Application Priority Data

Dec. 28, 2007 (KR) .................. 10-2007-0140093

(51) Int. Cl.
*G06F 7/04* (2006.01)
*G06F 12/00* (2006.01)
*H04L 9/32* (2006.01)

(52) U.S. Cl. .......... 726/19; 713/182; 713/185; 713/186; 345/661; 345/173

(58) Field of Classification Search .................. None
See application file for complete search history.

(56) References Cited

U.S. PATENT DOCUMENTS

| 5,559,961 | A | 9/1996 | Blonder | |
| 7,616,764 | B2 * | 11/2009 | Varghese et al. | 380/255 |
| 2010/0169958 | A1 * | 7/2010 | Werner et al. | 726/6 |

* cited by examiner

*Primary Examiner* — Nasser Moazzami
*Assistant Examiner* — Fikremariam Yalew
(74) *Attorney, Agent, or Firm* — Ballard Spahr LLP

(57) ABSTRACT

Provided are an apparatus and method for inputting a graphical password that use representative pictures and elemental pictures of a graphic to form a graphical password and that receive the graphic via a wheel interface and a select button for user authentication. The apparatus includes: an input unit having a wheel interface and a select button; a display for displaying a graphic consisting of representative pictures and elemental pictures, and displaying a changed graphic in response to an input from the wheel interface; a memory for storing a graphical password of a user; and a controller for recognizing, when the select button is pressed, the graphic displayed on the display as a user-input graphical password, and determining whether the input graphical password matches the stored graphical password for user authentication. Thus, it is possible to increase the number of cases for a password using a wheel interface for a higher security level of an embedded system that has a low security level due to a limited type and length of letters input as a password.

14 Claims, 13 Drawing Sheets

| Length | Numerical Password | Text Password | Inventive Graphical Password |
|---|---|---|---|
| 4 | $2^{13}$ | $2^{27}$ | $2^{28}$ |
| 5 | $2^{17}$ | $2^{33}$ | $2^{34}$ |
| 6 | $2^{20}$ | $2^{39}$ | $2^{41}$ |
| 7 | $2^{23}$ | $2^{46}$ | $2^{48}$ |
| 8 | $2^{27}$ | $2^{52}$ | $2^{55}$ |

FIG. 12

APPARATUS AND METHOD FOR INPUTTING GRAPHICAL PASSWORD USING WHEEL INTERFACE IN EMBEDDED SYSTEM

CROSS-REFERENCE TO RELATED APPLICATION

This application claims the benefit of Korean Patent Application No. 2007-0140093, filed Dec. 28, 2007, the disclosure of which is hereby incorporated herein by reference in its entirety.

BACKGROUND OF THE INVENTION

1. Field of the Invention

The present invention relates to an apparatus and method for inputting a graphical password that combine representative pictures and elemental pictures of a graphic to form a graphical password and that receive the graphic for user authentication.

Also, the present invention relates to an apparatus and method for inputting a graphical password that form a password by combining pictures of a graphic with a rotation direction of a wheel interface for user authentication.

Also, the present invention relates to increasing the number of cases for a password using a wheel interface for a higher security level of an embedded system that has a low security level due to a limited type and length of letters input as a password.

2. Discussion of Related Art

In general, an embedded device has a numerical password consisting of 4 digits according to traditional practice or for user convenience. The password of the embedded device has a very low security level.

A 4-digit password provides a very low security level. The number of cases for the 4-digit password is a total of 10,000. If it is assumed that a person can manually directly attempt to crack a password once a second, the security level of the 4-digit password can be cracked within about 3 hours. This means that a person holding a lost embedded device will probably find out the password. If an embedded device such as a mobile phone or a personal digital assistant (PDA) storing a lot of personal information is lost, there is a high risk of leakage of the personal information.

A higher security level for the password requires an increased number of cases for the password. This results from an increased length of the password or an increased number of cases for each digit of the password.

A method for increasing a password length will first be described. If a numerical password used in the embedded device has an increased length of 5 to 6 digits, the number of cases for the password increases to a total of $10^5$ to $10^6$. A financial IC chip actually embedded in a mobile phone for mobile banking is recommended to use a 6-digit password. This may block a person from manually directly attempting to crack the password to some extent, but may be difficult to block a crack attempt using a computer. It is well known that a 6-digit password can be cracked within several seconds by a computer. Since a longer password may make it difficult for a user to remember, an increased length of the password is not a fundamental solution to prevent from cracking.

A method for increasing the number of cases for a password by increasing the case number of each digit of the password will now be described. If alphabetic letters, numbers, and special characters are used for the password, the number of cases for a 4-digit password becomes $95^4$. A current embedded system mainly uses a numerical password because of a limited input module of the embedded system and in consideration of user convenience. For a mobile phone, if a user must use a password consisting of alphabetic letters, numbers, and special characters, this will greatly increase a number of times the user presses the keypad. This may degrade user convenience.

Schemes using a password for security of an embedded system must satisfy the following requirements.

The schemes must increase a security level of a password used in the embedded system for security. Since in a general embedded system a password-based access control is used as security means, a higher security level of the password guarantees the security of the embedded system.

In addition to having a higher security level, the password must be easy for a user to remember. In general, since a higher security level of the password requires an increased case number for the password, it may become difficult for a user to remember the password. In this case, the user may try to use words from a dictionary or from his or her personal information to make a password easier to remember, which rather decreases the security level of the password. Accordingly, there is a need for a password having a higher security level and being easy for a user to remember.

A password must be easy for a user to input on an embedded system. Since the embedded system has generally a limited type of input device, it is difficult to input a variety of passwords consisting of letters, numbers, special characters, and the like. For user convenience, a password input system must be configured so that a user easily inputs a password.

As a technique of satisfying security requirements based on the password of the embedded system, there is a graphical password-based scheme for making it easy for a user to remember the password with a higher security level in the embedded system. The graphical password is created by a user using a GUI and pictures. A person may be able to remember a graphical password more easily than a text-based password. Research has shown that a person can remember pictures more easily than texts.

An example of security technology based on a graphical password is disclosed in U.S. Pat. No. 5,559,961 (Aug. 24, 1996) entitled "Graphical Password". The prior technique relates to a graphical password apparatus and method in which a graphic image is displayed on a screen and a series of parts of the image are sequentially selected by a user to form a password.

However, the prior technique is suitable for implementing a graphical password in a general computer having an input device such as a mouse, but not for an embedded system that generally has a screen too small to display detailed pictures. The prior technique is also inconvenient to select a part of a graphic image displayed on the screen using an input device used in the embedded system. The input device employed in the embedded system is a touch pad or a touch screen. The former generally is inconvenient to use, and the latter does not serve fine selection due to its small screen to input with a blunt finger.

SUMMARY OF THE INVENTION

The present invention is directed to an apparatus and method for inputting a graphical password in an embedded system, in which a graphical password is formed using a graphic consisting of representative pictures and elemental pictures and the graphic is received via a wheel interface and a select button for user authentication.

The present invention is also directed to an apparatus and method for inputting a graphical password that form a password by combining pictures of a graphic with a rotation direction of a wheel interface for user authentication.

The present invention is also directed to an apparatus and method for inputting a graphical password that increase the number of cases for graphics that can be input, using up, down, left, right, and center input keys generally employed in an embedded system, as well as a wheel interface.

A first aspect of the present invention provides an apparatus for inputting a graphical password in an embedded system, the apparatus comprising: an input unit having a wheel interface and a select button; a display for displaying a graphic consisting of representative pictures and elemental pictures, and displaying a changed graphic in response to an input from the wheel interface; a memory for storing a graphical password of a user; and a controller for recognizing, when the select button is pressed, the graphic displayed on the display as a user-input graphical password, and determining whether the input graphical password matches the stored graphical password for user authentication.

A second aspect of the present invention provides an apparatus for inputting a graphical password in an embedded system, the apparatus comprising: an input unit including a wheel interface and a select button having M input keys; a display for displaying L representative pictures, and displaying, when one of the representative pictures is selected by the wheel interface, elemental pictures associated with the selected representative picture and corresponding to the input keys of the select button; a memory for storing a graphical password of a user, the graphical password consisting of N elemental pictures; and a controller for recognizing, when one of the input keys of the select button is pressed, that the elemental picture corresponding to the input key is input, and determining, when N elemental pictures are input, whether the input elemental pictures match the stored graphical password for user authentication.

A third aspect of the present invention provides an apparatus for inputting a graphical password in an embedded system, the apparatus comprising: an input unit including a wheel interface rotatable clockwise and counterclockwise, and a select button having M input keys; a display for displaying L representative pictures and a rotation direction of the wheel interface, and displaying, when one of the representative pictures is selected by the wheel interface, elemental pictures associated with the selected representative picture and corresponding to the input keys of the select button; a memory for storing a graphical password of a user, the graphical password consisting of combinations of N elemental pictures and the rotation direction; and a controller for recognizing, when one of the input keys of the select button is pressed, that a combination of the elemental picture corresponding to the input key and the rotation direction is input, and determining, when N combinations are input, whether the combinations match the stored graphical password for user authentication.

As described above, in the apparatus and method for inputting a graphical password in an embedded system according to the present invention, a graphic is input using the wheel interface and up, down, left, right, and center input keys that are generally employed in the embedded system. Thus, the apparatus and method can be applied to any other embedded systems and provide higher user convenience.

The apparatus and method for inputting a graphical password in an embedded system according to the present invention provide the following user convenience:

The graphical password based on the wheel interface is easy for users to remember. Even though the graphical password is longer than a conventional 4-digit password, users can easily remember the graphical password. The present invention is advantageous in that a password having a higher security level can be input only with the wheel interface. In general, a touch screen is used as an input module for a graphical password used in an embedded device. Advantageously, a wheel interface mainly mounted in an embedded device can be utilized as is.

Also, since the wheel interface has been used in a number of devices for a long time, it is user-friendly. The wheel interface allows a user to input a password with minimal operation. A 4-digit password can be input by a user performing a wheel turning operation and an elemental-picture selection operation, each four times.

In the apparatus and method for inputting a graphical password in an embedded system according to the present invention, a case number corresponding to one digit of the password can increase by means of a case number for a representative picture by a wheel interface, a case number by the rotation direction of the wheel interface, a case number for the select button having several input keys. This increases a security level of the password for a secure embedded system.

The security level of the graphical password in the embedded system according to the present invention will be described with reference to FIG. 10. FIG. 10 illustrates a table showing a comparison between a case number for the graphical password according to the present invention and a case number of a number password and a text password of a conventional embedded device.

When the graphical password based on the wheel interface consists of 12 representative pictures and 5 elemental pictures as shown in FIG. 4, the user has a chance to select a total of 60 elemental pictures. Since the user is allowed to turn the wheel interface clockwise and counterclockwise to select the elemental picture, there are two further cases. Accordingly, there is a case number of 120 for one selection of the elemental picture. If the user selects the elemental picture four times, the case number for the password becomes a total of $120^4$ (i.e., about $2^{28}$). The resultant password is about 20,000 times stronger than a 4-digit password.

In FIG. 10, the table shows a comparison in case number among a numerical password of a conventional embedded device, a text password based on alphabetic letters, numbers, and special characters, and the graphical password based on the wheel interface. For easy comparison, the case number is represented by an approximate value of 2's power. It can be seen that the graphical password based on the wheel interface has a relatively higher security level.

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which:

FIG. 12 illustrates a table showing a comparison between a case number for the graphical password according to the present invention and a case number of a number password and a text password of a conventional embedded device.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1:
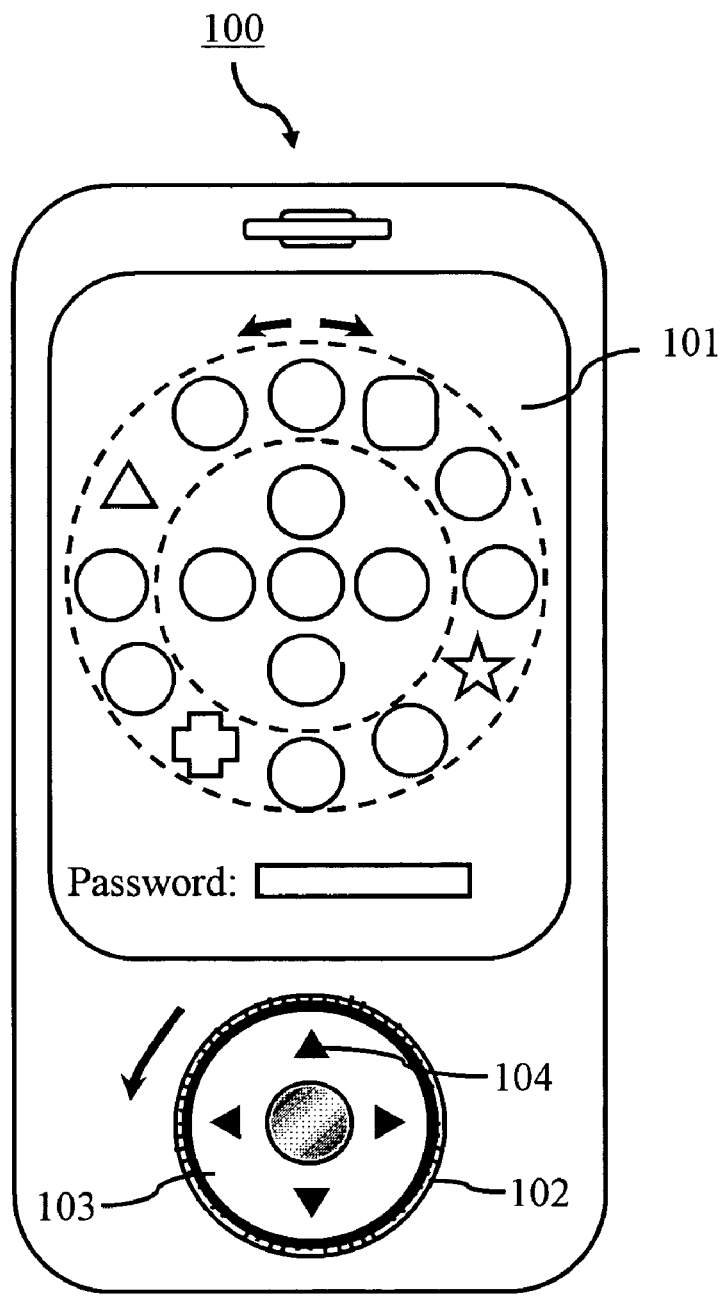
FIG. 1 is an exemplary construction of an embedded system according to an embodiment of the present invention.

First, an embedded system having a graphical-password input device according to an embodiment of the present invention will be described with reference to FIG. 1. FIG. 1 is an exemplary construction of an embedded system according to an embodiment of the present invention.

Referring to FIG. 1, the embedded system 100 comprises a display (or a screen unit) 101, a wheel interface 102, and a select button 103.

A user turns the wheel interface 102 to select a desired menu, and the device takes a corresponding action. It is well known that volume adjustment in audio devices or channel selection in out-of-date televisions is made by such a wheel interface. A wheel interface has been used in various devices for a long time and is very familiar to users. A recent trend is that the wheel interface is employed in various embedded equipment such as MP3 players, mobile phone, and navigators. Advantageously, various functions of an embedded device can be efficiently controlled only with the wheel interface. The wheel interface 102 may be turned clockwise or counterclockwise to select a menu.

The select button 103 is for selection in a general embedded system. The select button 103 includes up, down, left, right, and center input keys 104. The select button 103 has been widely used as an input device for typical embedded systems, such as mobile phones, remote controls, and MP3 players.

The display 101 has a small screen because the embedded system has a limited size. The display 101 may generally be an LCD display device. It will be easily appreciated that any display device may be used as the display 101.

The wheel interface 102 and the select button 103 may be implemented as a virtual wheel interface and a virtual select button by a touch pad or a touch screen. For the touch pad, when a user draws a circle clockwise or counterclockwise on the touch pad with his or her finger, it is recognized as the wheel interface being turned in that direction. Since the implementation of the virtual wheel interface or select button by the touch pad or the touch screen is well known in the art, a detailed description thereof will be omitted.

Figure 2:
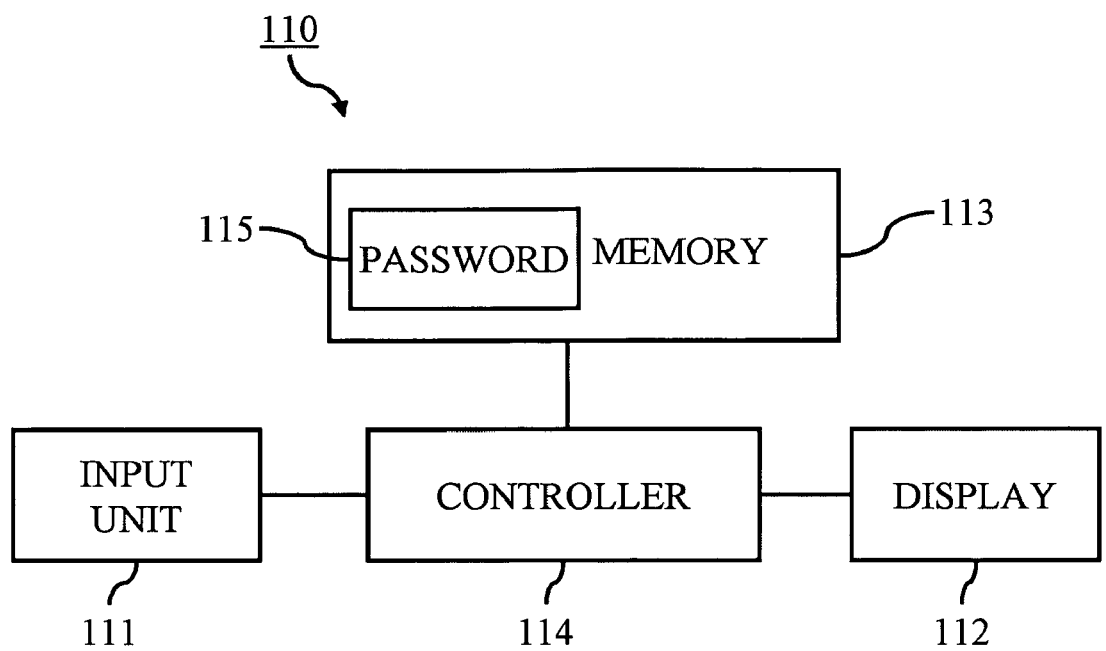
FIG. 2 is a block diagram illustrating a graphical-password input device of an embedded system according to an embodiment of the present invention.
Figure 3:
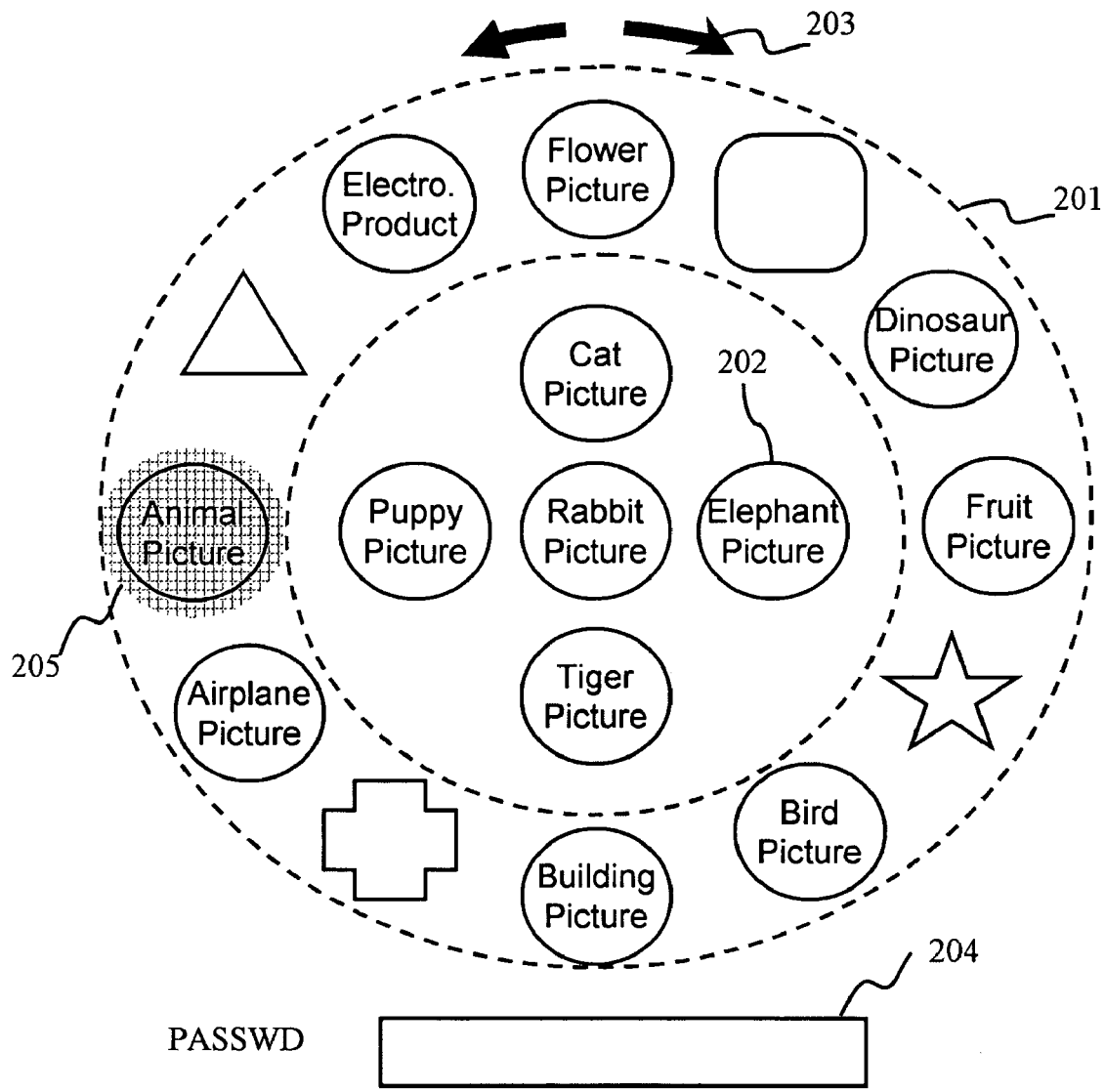
FIG. 3 is an exemplary construction of a display of the graphical-password input device according to an embodiment of the present invention.

A graphical-password input device of the embedded system according to an embodiment of the present invention will now be described with reference to FIGS. 2 to 4. FIG. 2 is a block diagram illustrating a graphical-password input device of an embedded system according to an embodiment of the present invention. FIG. 3 is an exemplary construction of a display of the graphical-password input device. FIG. 4 illustrates an example of operation of the graphical-password input device.

Referring to FIG. 2, the graphical-password input device 110 of the embedded system according to an embodiment of the present invention comprises an input unit 111, a display 112, a memory 113, and a controller 114.

The input unit 111 receives an input from the above input device of the embedded system. In other words, the input unit 111 comprises the wheel interface 102 and the select button 103, which constitute the input device of the embedded system. The select button 103 includes up, down, left, right, and center input keys 104.

The display 112 displays a graphic consisting of representative pictures and elemental pictures, and displays a changed graphic in response to an input from the wheel interface. As shown in FIG. 3, the display 112 displays representative pictures 201, elemental pictures 202, a rotation direction 203 of the wheel interface, a password indication window 204, and a focus 205.

A graphical password according to the present invention will first be described with reference to FIG. 3 prior to describing a scheme by which the display 112 displays a changed graphic in response to an input from the wheel interface.

The graphical password according to an embodiment of the present invention is based on a series of elemental pictures 202. For example, when a length of the password is 4, Elemental picture 1, Elemental picture 2, Elemental picture 3, and Elemental picture 4 are sequentially selected to form the password. The series of elemental pictures are registered as the graphical password, and a user, when inputting the same graphical password, may be authenticated. The representative pictures 201 are not direct elements of the graphical password, but are used only for classification of a plurality of elemental pictures. For example, in order to select any one of the plurality of elemental pictures 202, the user selects the representative picture 201 and then selects the elemental picture 202 belonging to the representative picture 202.

The graphical password according to another embodiment of the present invention uses the rotation direction 203 of the wheel interface, in addition to the elemental pictures 202. That is, the user selects the representative picture 201 using the wheel interface 102 in order to select one of the elemental pictures 202. In this case, whether the user turns the wheel interface 102 clockwise or counterclockwise is considered. That is, when one of the elemental pictures 202 belonging to the selected representative picture 201 is selected, the password is recognized from a combination of the selected elemental picture 202 and the rotation direction 203 of the wheel interface. In other words, even though the same elemental picture 202 is selected, it is identified as a different elemental picture according to the rotation direction 203 of the wheel interface in selecting the representative picture 201 to which the elemental picture 202 belongs. That is, a combination of the elemental picture 202 and the rotation direction 203 is used for the graphical password.

For reference, the graphical password is made like a password of an actual analog strongbox. The password of the analog strongbox is recognized by turning a wheel clockwise or counterclockwise for a digit and then continuously turning the wheel clockwise or counterclockwise for other digits. The password is recognized by a combination of the wheel direction and the number. On the other hand, the present invention does not necessarily require continuously changing the rotation direction, i.e., clockwise and then counterclockwise.

In other words, for the graphical password according to the present invention, the user is allowed to continuously turn the wheel interface in the same direction because final selection is made by the select button. Alternatively, the user is allowed to turn the wheel interface clockwise and then counterclockwise before pressing the select button. In this case, a final rotation direction is input. That is, when the select button 103 is pressed, the rotation direction 203 of the wheel interface displayed on the display 112 of FIG. 3 is input.

A scheme by which the display 112 displays a changed graphic in response to an input from the wheel interface and the graphical password is input by the input unit 111 will now be described with reference to FIGS. 4a and 4b.

A graphical password that can be input by the user is displayed on the display 301 of the embedded equipment. The rotation direction 203 of the wheel is also displayed on the screen and the representative pictures 201 are displayed while drawing a virtual circle. The elemental pictures 202 associated with each representative picture are displayed at a center of the screen and the focus 205 is placed on the currently selected representative picture. The rotation direction 203 of the wheel is displayed depending on the direction in which the user turns the wheel, and the focus 205 is placed on the representative picture 201 selected by the user turning the wheel. As the wheel rotates, the focus may move on the screen. On the contrary, the focus is stationary and the circle of the representative pictures may be rotated. The elemental pictures 202 for the representative picture 201 on which the focus is placed are also displayed on the screen. The elemental pictures 202 are associated with the representative picture 201. The elemental pictures 202 are pictures of objects associated with the representative picture or color-changed versions of the representative picture. For example, the elemental pictures 202 associated with an animal picture as the representative picture 201 may include a cat picture, a puppy picture, a rabbit picture, an elephant picture, a tiger picture, etc. For another example, the elemental pictures 202 associated with an asterisk as the representative picture 201 may include a blue asterisk, a purple asterisk, a red asterisk, a yellow asterisk, a green asterisk, etc.

Figure 4A:
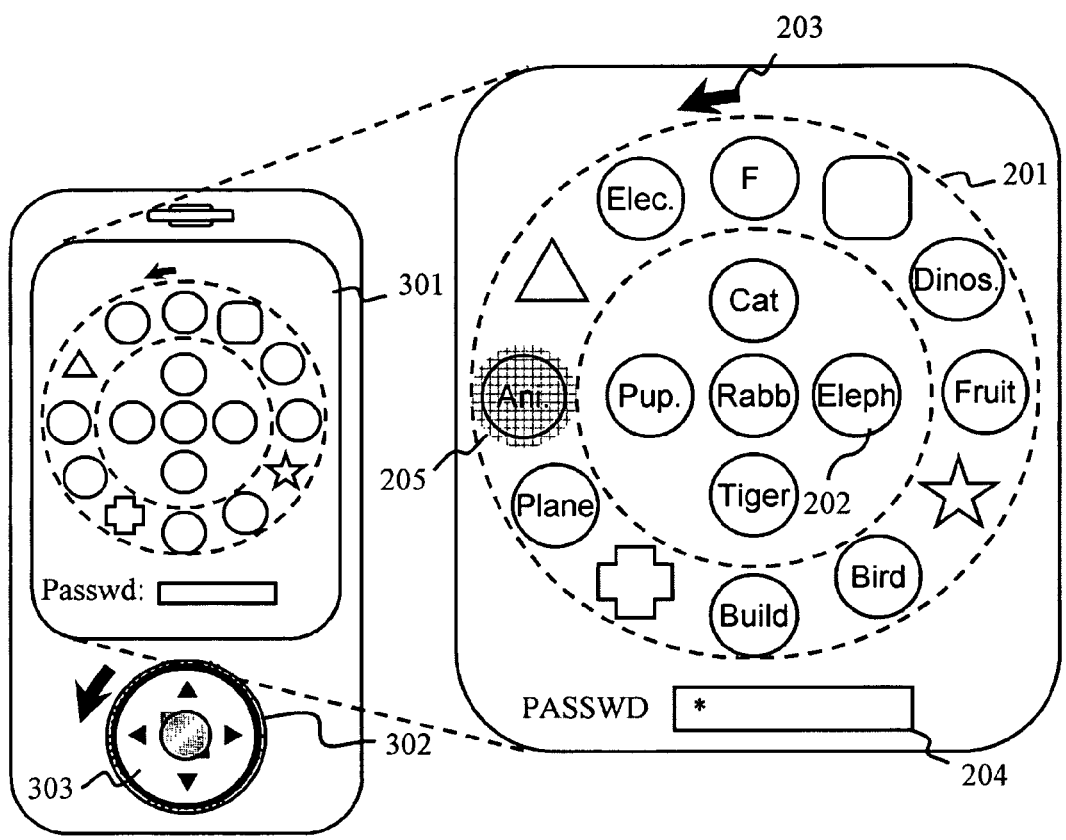
FIG. 4 illustrates an example of operation of the graphical-password input device according to an embodiment of the present invention.
Figure 4B:
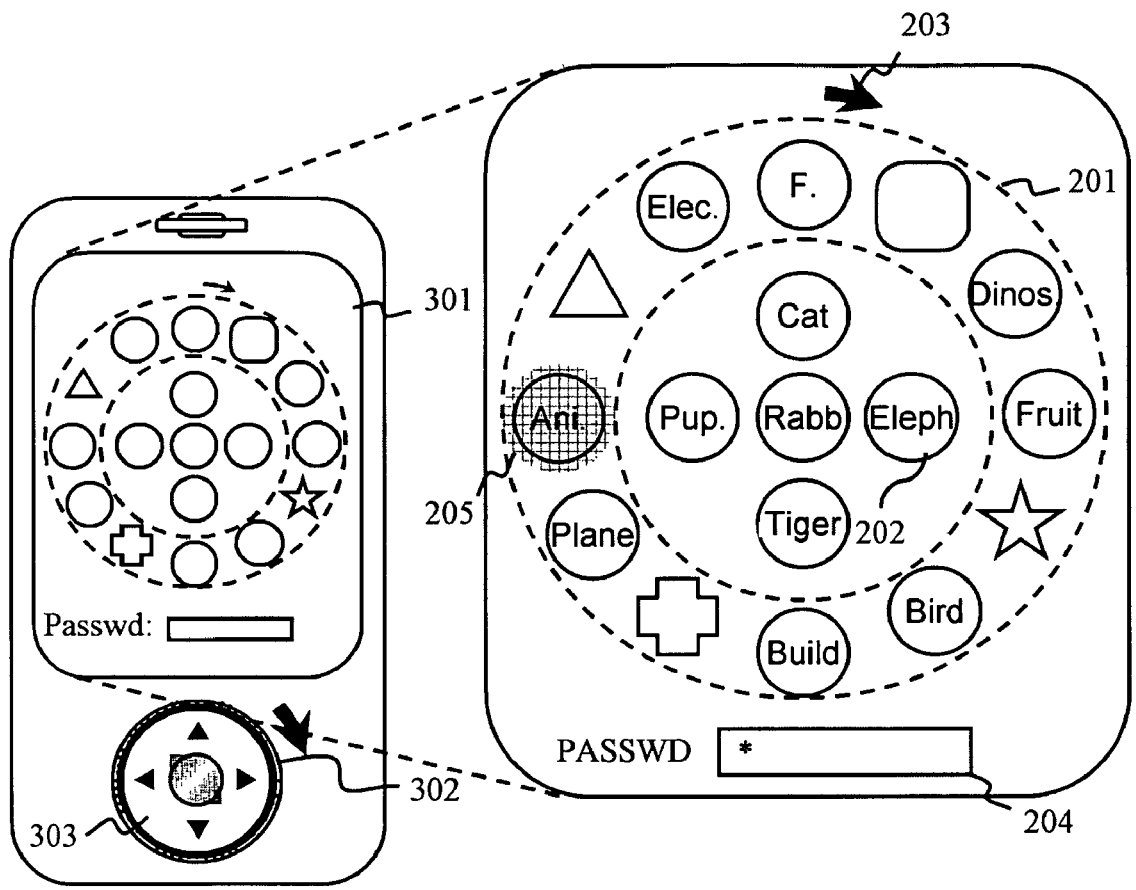

Referring to FIG. 4a, the graphical-password input device of the embedded system according to an embodiment of the present invention comprises interfaces, such as a rotatable wheel interface 302, and a select button 303 having up, down, left, right, and center input keys. The number of the input keys in the select button 303 may be changed. The wheel interface 302 and the select button 303 may be implemented as a virtual wheel interface by a physical device, a touch pad, or a touch screen, as described above. In order to input the password, the user locates the focus 205 on the representative picture 201 by turning the wheel interface 302 and selects the elemental picture 202 using the select button 303. In this case, the direction in which the user turns the wheel and the elemental picture 202 that the user selects are input as the password. The input password is displayed in a form not recognized by other persons on the password indication window 204. In FIG. 4a, the user turns the wheel interface 302 counterclockwise to locate the focus 205 on the animal picture as the representative picture 201, and presses the left input key of the select button 303 to input the puppy picture as the password. In FIG. 4b, the user turns the wheel interface 302 clockwise to locate the focus 205 on the asterisk as the representative picture 201, and presses the up input key of the select button 303 to input the blue asterisk as the password.

Meanwhile, the number of the representative pictures 201 and the number of the elemental pictures 202 corresponding to each representative picture may be changed. FIGS. 4a and 4b show 12 representative pictures 201 and 5 elemental picture 202 associated with each representative picture. However, the number of the elemental pictures 202 associated with the representative picture 201 is desirably determined by the number of the input keys in the select button 303. This is because the elemental pictures 202 belonging to the representative picture are selected by the select button 303. When one elemental picture is selected by one input, it is impossible to increase the number of the elemental pictures to more than the number of the input keys. The number of the elemental pictures may be smaller than that of the input keys.

Preferably, an arrangement of the elemental pictures 202 corresponds to that of the input keys, and locations of the input key correspond to those of the elemental pictures. This can provide an intuitive interface to the user.

Referring back to FIG. 2, the memory 113 stores the graphical password 115 of the user registered as described above. The graphical password of the user is formed of a series of elemental pictures or a combination of a series of elemental pictures. The combination includes a combination of the elemental pictures and the rotation direction.

The controller 114 controls the memory 113, the display 112, and the input unit 111 and determines whether a user-input password matches the registered password 115. When one of the input keys of the select button 103 of the input unit 111 is pressed, the controller 114 recognizes that the elemental picture 202 corresponding to the input key (or a combination of the elemental picture 202 and the rotation direction 203) is input. When a series of elemental pictures (or a combination thereof) are input, the controller 114 determines whether the input elemental pictures match the stored graphical password for user authentication.

Since the password of the embedded system generally consists of 4 digits, the graphical password preferably consists of 4 digits. It will be easily appreciated that the password of the embedded system may have any other length.

In the graphical-password input device according to the present invention, the password length is fixed, but may be changed. For example, the center input key of the select button may be used as a "confirm" key. In this case, the graphical password with a variable length is input and then the confirm key is pressed to finally input the password. This example reduces the number of the input keys corresponding to the elemental pictures by one, leading to a smaller number of cases for each digit of the graphical password.

Hereinafter, the length of the password is denoted by N, the number of the input keys M, and the number of the representative pictures L. Here, N, M, and L are all integers of 1 or greater.

Figure 5:
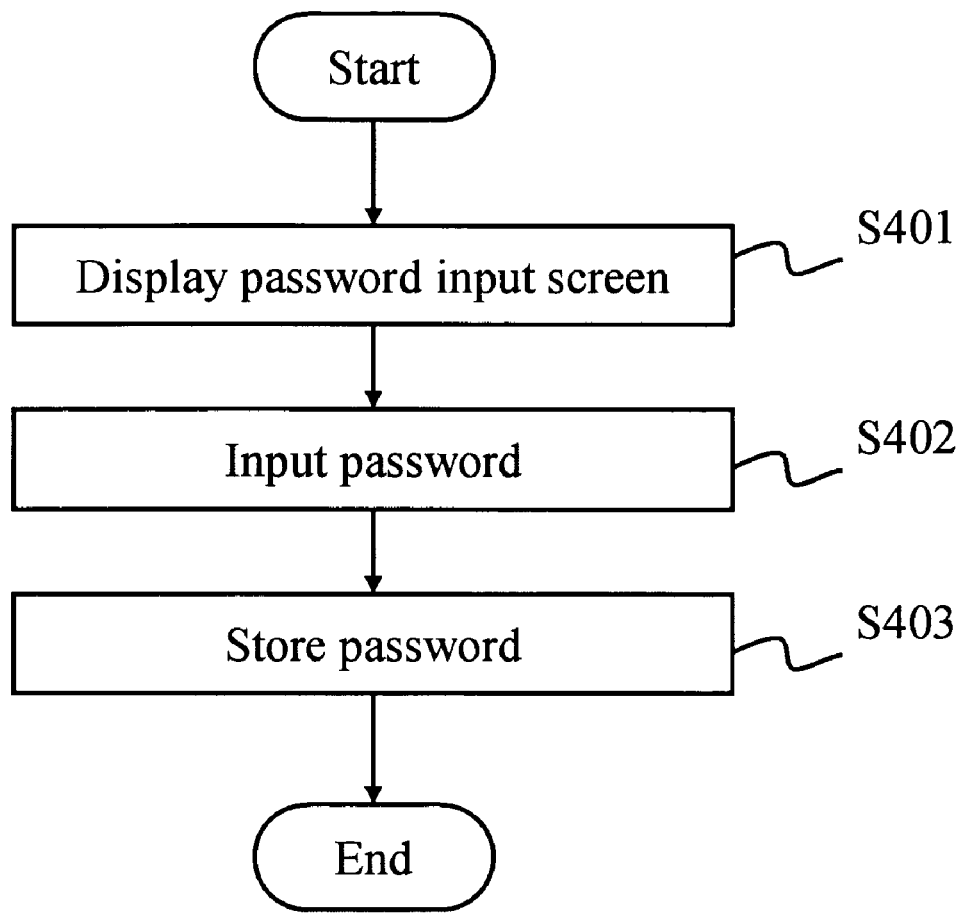
FIG. 5 is a flowchart illustrating a method for registering a graphical password in an embedded system according to an embodiment of the present invention.

A method for registering a graphical password in an embedded system according to an embodiment of the present invention will now be described with reference to FIG. 5. FIG. 5 is a flowchart illustrating a method for registering a graphical password in an embedded system according to an embodiment of the present invention.

As shown in FIG. 5, a user may register a password. First, the embedded system displays a password input screen on the display 301 of the embedded system through the display 112, as shown in FIG. 3 (S401). The user inputs a password using the wheel interface 302 of the embedded equipment through the input unit 111, as in FIG. 4 (S402). The controller 114 of the embedded system registers a direction in which the user turns the wheel interface and an elemental picture 202 that the user selects, as a password, in the memory 113 (S403).

Figure 6:
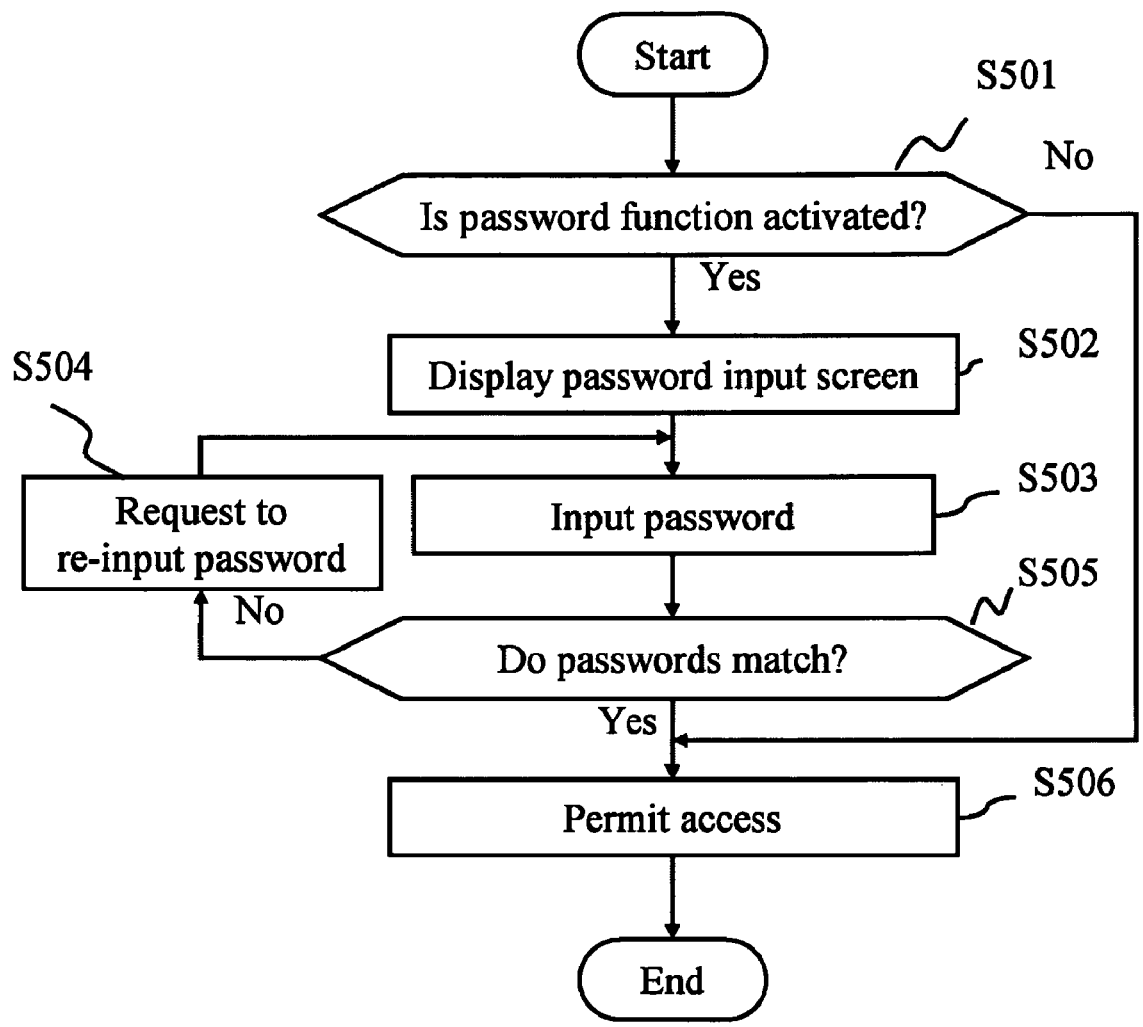
FIG. 6 is a flowchart illustrating a method for controlling access to an embedded system using a graphical password according to an embodiment of the present invention.

A method for controlling access to an embedded system using a graphical password according to an embodiment of the present invention will now be described with reference to FIG. 6. FIG. 6 is a flowchart illustrating a method for controlling access to an embedded system using a graphical password according to an embodiment of the present invention.

As shown in FIG. 6, a user has access to the embedded system. When a user tries to use the embedded system, a determination is made as to whether a password function is activated (S501). If the password function is activated, the password input screen is displayed on the display 101 of the embedded system through the display 112 (S502). Otherwise, the access to the embedded system is permitted (S506). The user inputs a password using the password input screen and the wheel interface 302 through the input unit 111 (503). The controller 114 of the system compares the input password with the password 115 registered in the memory 113 (S505). If they match, the controller 114 permits user access to the embedded system (S506). If they do not match, the controller 114 requests the user to re-input the password (S504).

Figure 7:
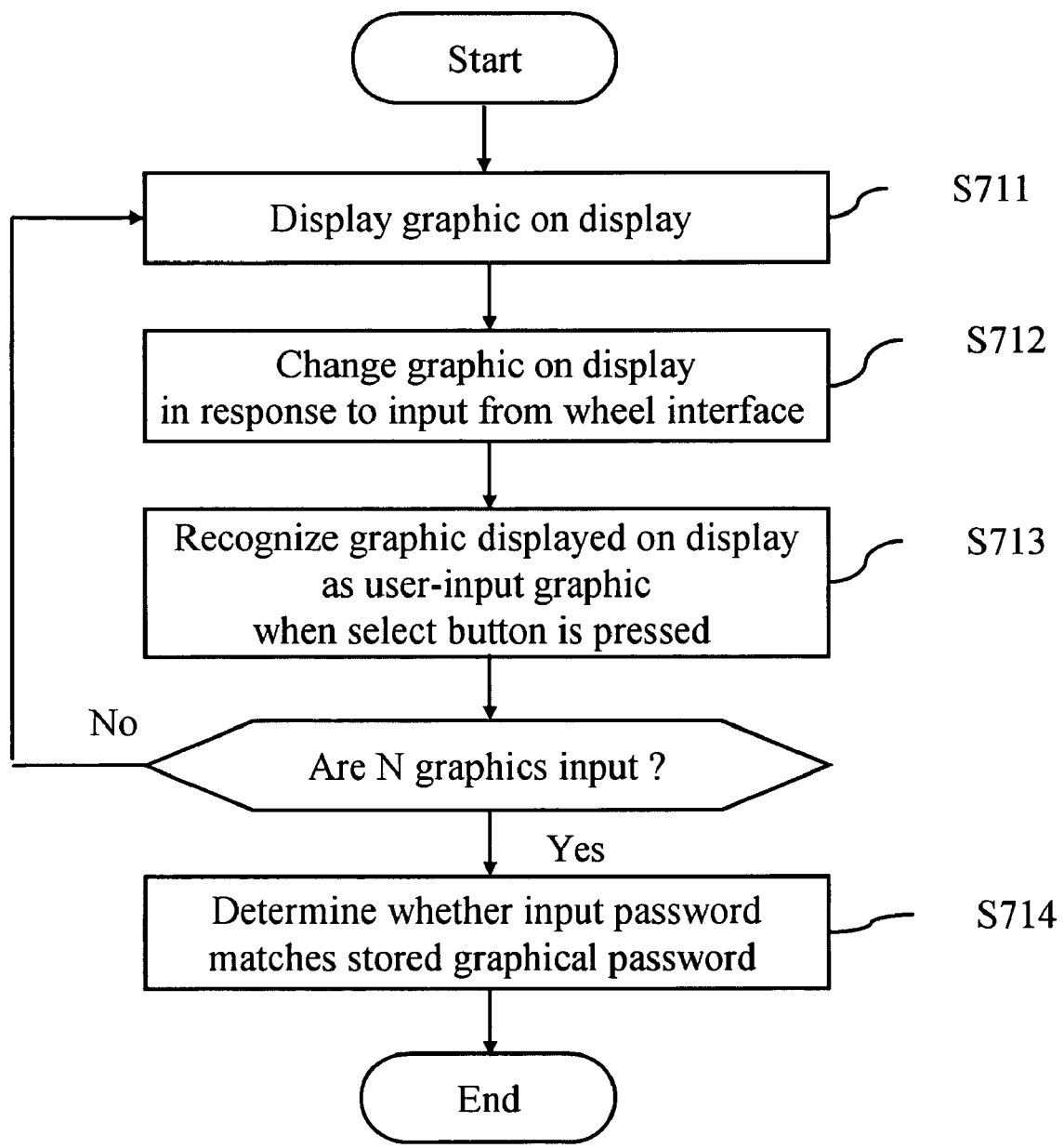
FIG. 7 is a flowchart illustrating a method for inputting a graphical password in an embedded system according to a second embodiment of the present invention.

A method for inputting a graphical password in an embedded system according to a second embodiment of the present invention will now be described with reference to FIG. 7. FIG. 7 is a flowchart illustrating a method for inputting a graphical password in an embedded system according to a second embodiment of the present invention.

As shown in FIG. 7, the method for inputting a graphical password in an embedded system according to a second embodiment of the present invention comprises the steps of: (a) displaying a graphic consisting of representative pictures and elemental pictures on the display (S711); (b) displaying a changed graphic on the display in response to an input from the wheel interface (S712); (c) recognizing the graphic displayed on the display as a user-input graphic when the select button is pressed (S713); (d) determining, when N graphics are input through repetition of steps (a) to (c), whether the N graphics match the stored graphical password for user authentication (S714).

Figure 8:
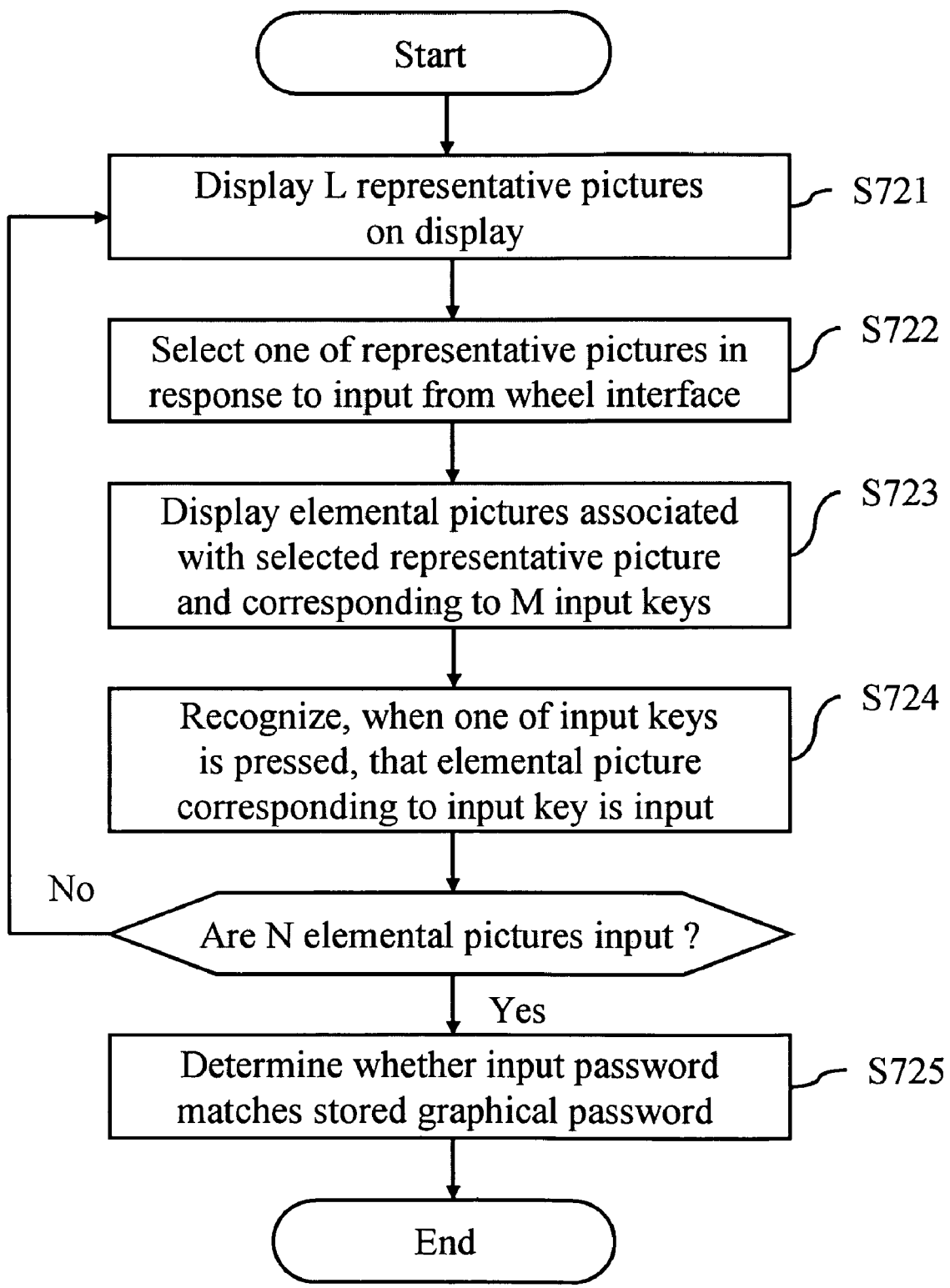
FIG. 8 is a flowchart illustrating a method for inputting a graphical password in an embedded system according to a third embodiment of the present invention.

A method for inputting a graphical password in an embedded system according to a third embodiment of the present invention will now be described with reference to FIG. 8. FIG. 8 is a flowchart illustrating a method for inputting a graphical password in an embedded system according to a third embodiment of the present invention.

As shown in FIG. 8, the method for inputting a graphical password in an embedded system according to a third embodiment of the present invention comprises the steps of: (a) displaying L representative pictures on the display (S721), (b1) selecting one of the representative pictures in response to an input from the wheel interface (S722), (b2) displaying elemental pictures associated with the selected representative picture and corresponding to the input keys of the select button on the display (S723), (c) recognizing, when one of the input keys of the select button is pressed, that an elemental picture corresponding to the input key is input (S724), (d) determining, when N elemental pictures are input through repetition of steps (a) to (c), whether the N elemental pictures match the stored graphical password for user authentication (S725).

In step (b1), when one of the representative pictures is selected by the wheel interface, the focus is placed on the selected representative picture.

Also, the representative pictures are arranged to draw a circle and displayed on the display, and are rotated along the circle with the rotation of the wheel interface.

In step (b2), the elemental pictures are arranged in a center of the circle of the representative pictures and similarly to the input keys.

The elemental pictures are pictures of objects associated with the representative picture to which the elemental pictures belong or are color-changed versions of the representative picture.

For detailed content, see the above description of the graphical-password input device of the embedded system according to an embodiment of the present invention.

Figure 9:
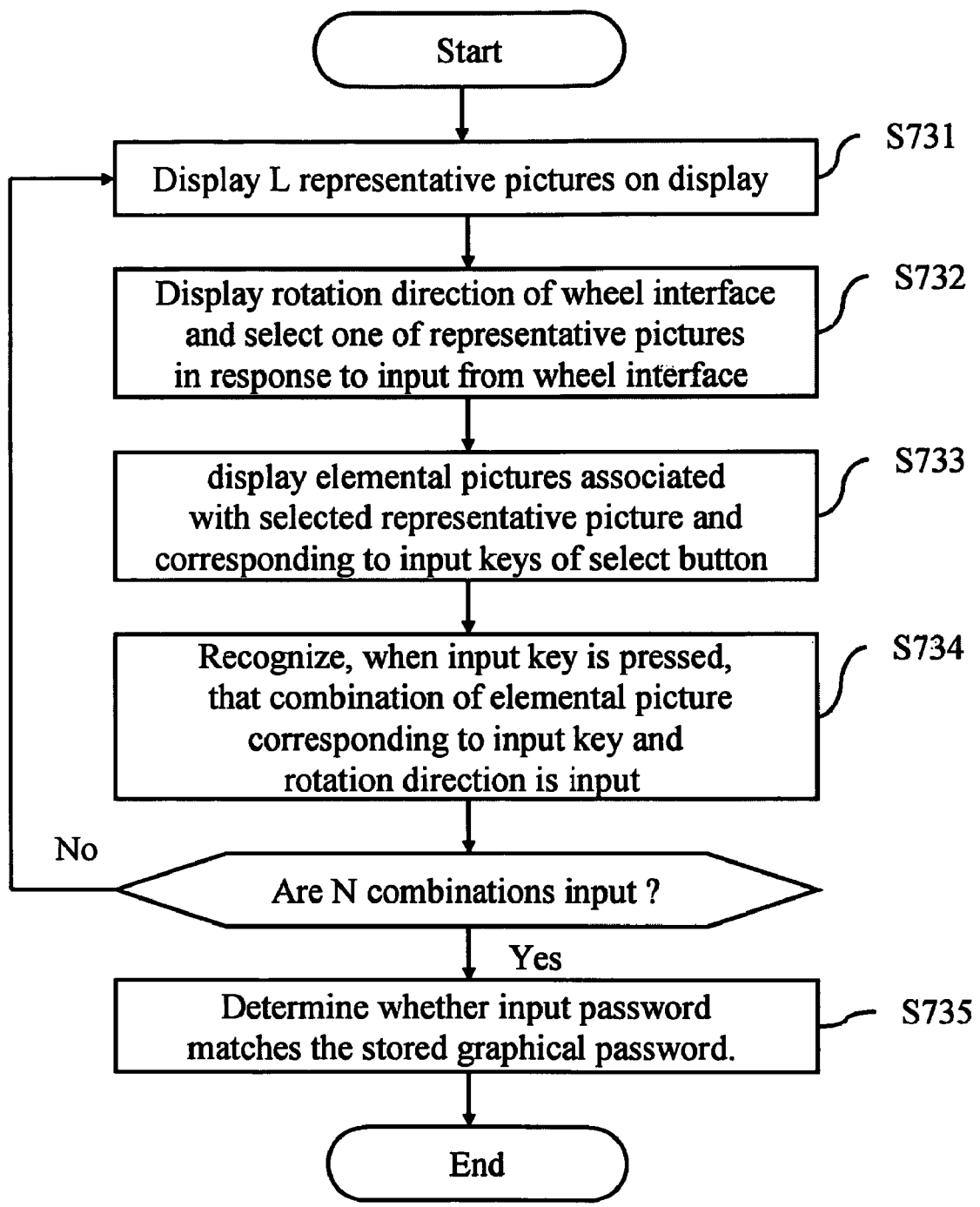
FIG. 9 is a flowchart illustrating a method for inputting a graphical password in an embedded system according to a fourth embodiment of the present invention.

A method for inputting a graphical password in an embedded system according to a fourth embodiment of the present invention will now be described with reference to FIG. 9. FIG. 9 is a flowchart illustrating a method for inputting a graphical password in an embedded system according to a fourth embodiment of the present invention.

As shown in FIG. 9, the method for inputting a graphical password in an embedded system according to the fourth embodiment of the present invention is directed to a method for inputting a graphical password in an embedded system comprising a wheel interface rotatable clockwise and counterclockwise, a select button having M input keys, and a display. The method comprises the steps of: (a) displaying L representative pictures on the display (S731), (b1) displaying a rotation direction of the wheel interface on the display and selecting one of the representative pictures in response to an input from the wheel interface (S732), (b2) displaying elemental pictures associated with the selected representative picture and corresponding to the input keys of the select button on the display (S733), (c) recognizing, when one of the input keys of the select button is pressed, that a combination of the elemental picture corresponding to the input key and the rotation direction is input (S734), and (d) determining, when N combinations are input through repetition of steps (a) to (c), whether the combinations match the stored graphical password for user authentication (S735).

In step (b1), when one of the representative pictures is selected by the wheel interface, the focus is displayed on the selected representative picture.

Also, the representative pictures are arranged to draw a circle and displayed on the display, and are rotated along the circle with the rotation of the wheel interface.

In step (b2), the elemental pictures are arranged in a center of the circle of the representative pictures and similarly to the input keys.

The elemental pictures are pictures of objects associated with the representative picture to which the elemental pictures belong, or are color-changed versions of the representative picture.

For detailed content, see the above description of the graphical-password input device of the embedded system according to an embodiment of the present invention.

Figure 10:
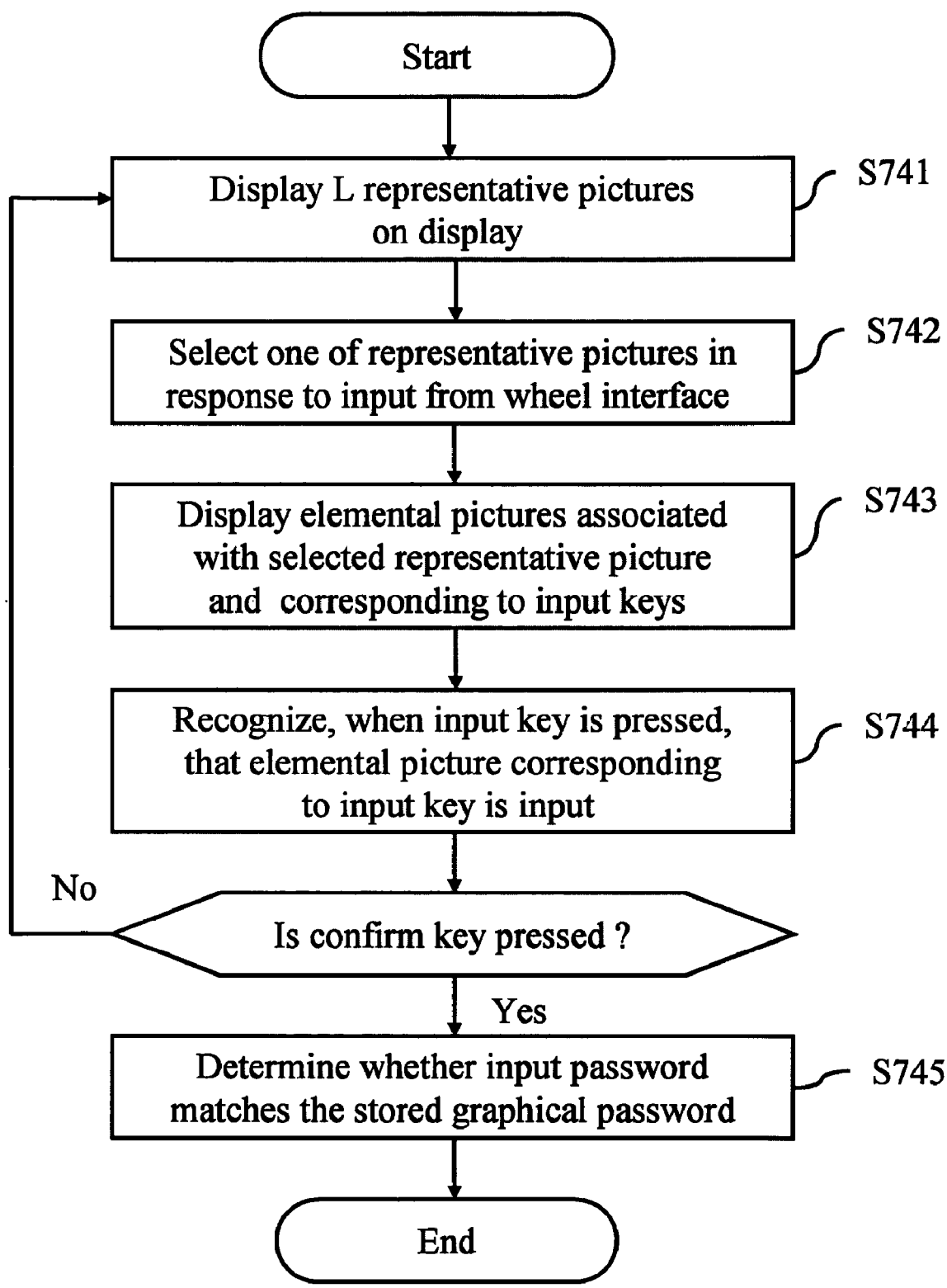
FIG. 10 is a flowchart illustrating a method for inputting a graphical password in an embedded system according to a fifth embodiment of the present invention.

A method for inputting a graphical password in an embedded system according to a fifth embodiment of the present invention will now be described with reference to FIG. 10. FIG. 10 is a flowchart illustrating a method for inputting a graphical password in an embedded system according to a fifth embodiment of the present invention.

As shown in FIG. 10, the method for inputting a graphical password in an embedded system according to the fifth embodiment of the present invention comprises the steps of: (a) displaying L representative pictures on the display, (b1) selecting one of the representative pictures in response to an input from the wheel interface, (b2) displaying elemental pictures associated with the selected representative picture and corresponding to the input keys of the select button on the display, (c) recognizing, when one of the input keys of the select button is pressed, that the elemental picture corresponding to the input key is input as one digit of the password, and (d) repeatedly performing steps (a) to (c) and determining, when the confirm key is pressed, whether the input password matches the stored graphical password for user authentication.

In step (b1), when one of the representative pictures is selected by the wheel interface, the focus is placed on the selected representative picture.

Also, the representative pictures are arranged to draw a circle and displayed on the display, and are rotated along the circle with the rotation of the wheel interface.

In step (b2), the elemental pictures are arranged in a center of the circle of the representative pictures and similarly to the input keys.

The elemental pictures are pictures of objects associated with the representative picture to which the elemental pictures belong or are color-changed versions of the representative picture.

For detailed content, see the above description of the graphical-password input device of the embedded system according to an embodiment of the present invention.

Figure 11:
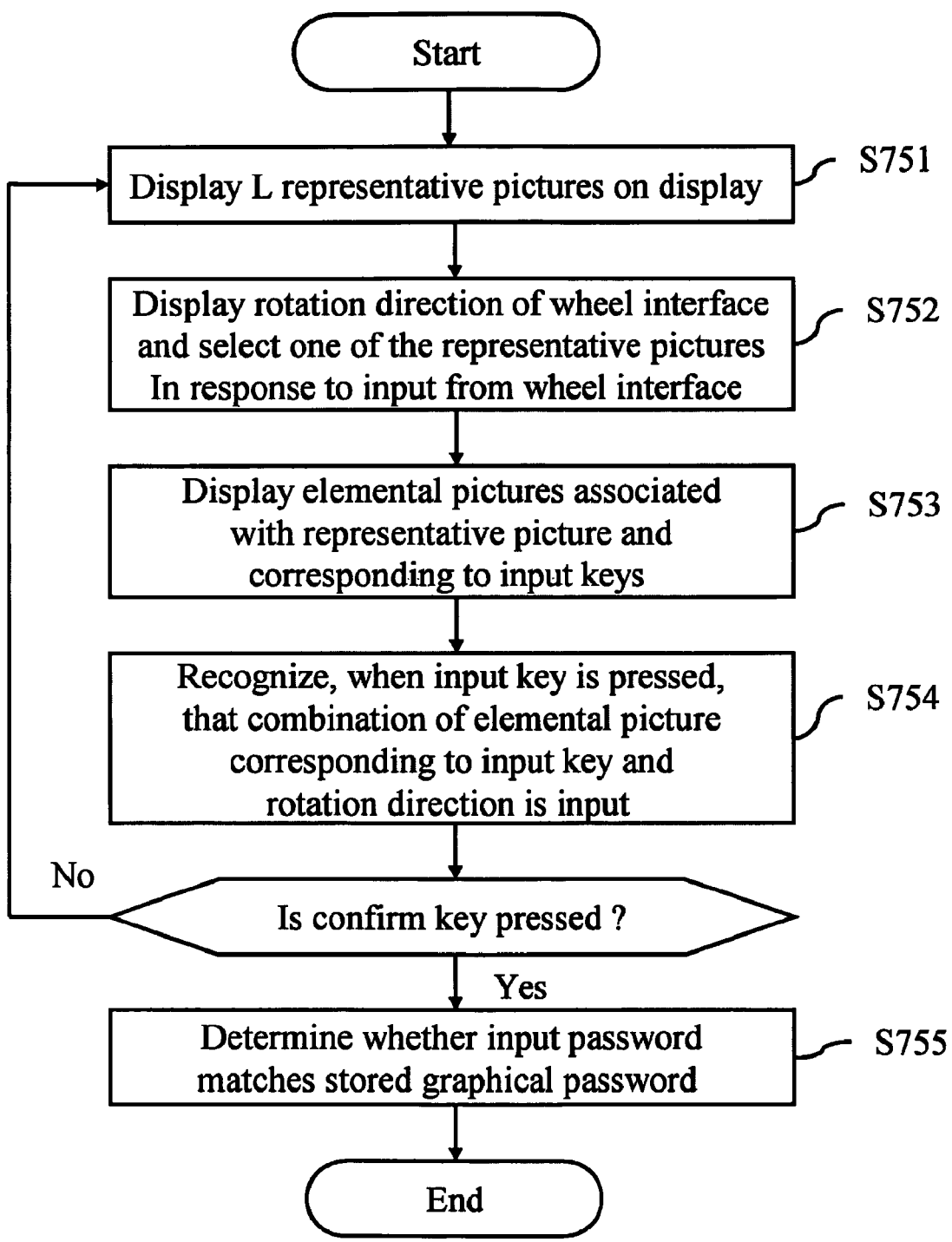
FIG. 11 is a flowchart illustrating a method for inputting a graphical password in an embedded system according to a sixth embodiment of the present invention.

A method for inputting a graphical password in an embedded system according to a sixth embodiment of the present invention will now be described with reference to FIG. 11. FIG. 11 is a flowchart illustrating a method for inputting a graphical password in an embedded system according to a sixth embodiment of the present invention.

As shown in FIG. 11, the method for inputting a graphical password in an embedded system according to the sixth embodiment of the present invention comprises: (a) displaying L representative pictures on the display, (b1) displaying a rotation direction of the wheel interface on the display and selecting one of the representative pictures in response to an input from the wheel interface, (b2) displaying elemental pictures associated with the representative picture and corresponding to the input keys of the select button on the display, (c) recognizing, when one of the input keys of the select button is pressed, that a combination of the elemental picture corresponding to the input key and the rotation direction is input as one digit of the password, and (d) repeatedly performing steps (a) to (c) and determining, when the confirm key is pressed, whether the input password matches the stored graphical password for user authentication.

In step (b1), when one of the representative pictures is selected by the wheel interface, the focus is placed on the selected representative picture.

Also, the representative pictures are arranged to draw a circle and displayed on the display, and are rotated along the circle with the rotation of the wheel interface.

In step (b2), the elemental pictures are arranged in a center of the circle of the representative pictures and similarly to the input keys.

The elemental pictures are pictures of objects associated with the representative picture to which the elemental pictures belong or are color-changed versions of the representative picture.

For detailed content, see the above description of the graphical-password input device of the embedded system according to an embodiment of the present invention.

The present invention can be applied to the field of user authentication based on a password in the embedded system, and particularly, to a variety of embedded systems, such as MP3 players, mobile phones, and navigators.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for inputting a graphical password in an embedded system, the apparatus comprising:
    an input unit including a wheel interface and a select button having M input keys;
    a display for displaying L representative pictures and displaying elemental pictures in correspondence to the input keys of the select buttons, and displaying, when one of the representative pictures is selected by the wheel interface, elemental pictures which belong to the selected representative picture;
    a memory for storing a graphical password of a user, the graphical password consisting of N elemental pictures; and
    a controller for recognizing, when one of the input keys of the select button is pressed, that the elemental picture corresponding to the input key is input, and determining, when N elemental pictures are input, whether the input elemental pictures match the stored graphical password for user authentication.

2. An apparatus for inputting a graphical password in an embedded system, the apparatus comprising:
    an input unit including a wheel interface rotatable clockwise and counterclockwise, and a select button having M input keys;
    a display for displaying L representative pictures and a rotation direction of the wheel interface and displaying elemental pictures in correspondence to the input keys of the select buttons, and displaying, when one of the representative pictures is selected by the wheel interface, elemental pictures which belong to the selected representative picture;
    a memory for storing a graphical password of a user, the graphical password consisting of combinations of N elemental pictures and the rotation direction; and
    a controller for recognizing, when one of the input keys of the select button is pressed, that a combination of the elemental picture corresponding to the input key and the rotation direction is input, and determining, when N combinations are input, whether the combinations match the stored graphical password for user authentication.

3. An apparatus for inputting a graphical password in an embedded system, the apparatus comprising:
    an input unit including a wheel interface, and a select button having at least one input key and one confirm key;
    a display for displaying L representative pictures and displaying elemental pictures in correspondence to the input keys of the select buttons, and displaying, when one of the representative pictures is selected by the wheel interface, elemental pictures which belong to the selected representative picture;

a memory for storing a graphical password of a user, the graphical password consisting of at least one elemental picture; and a controller for recognizing, when one of the input keys of the select button is pressed, that the elemental picture corresponding to the input key is input as one digit of the password, and determining, when the confirm key is pressed, whether the input password matches the stored graphical password for user authentication.

4. An apparatus for inputting a graphical password in an embedded system, the apparatus comprising:

an input unit including a wheel interface rotatable clockwise and counterclockwise, and a select button having at least one input key and one confirm key;

a display for displaying L representative pictures and a rotation direction of the wheel interface and displaying elemental pictures in correspondence to the input keys of the select buttons, and displaying, when one of the representative pictures is selected by the wheel interface, elemental pictures which belong to the selected representative picture;

a memory for storing a graphical password of a user, the graphical password consisting of combinations of at least one elemental picture and the rotation direction; and a controller for recognizing, when one of the input keys of the select button is pressed, that a combination of the elemental picture corresponding to the input key and the rotation direction is input as one digit of the password, and determining, when the confirm key is pressed, whether the input password matches the stored graphical password for user authentication.

5. The apparatus of claim 1 or 2, wherein the input keys of the select button include five keys: up, down, left, right, and center keys.

6. The apparatus claim 1 or 2, wherein the display displays, when one of the representative pictures is selected by the wheel interface, a focus placed on the selected representative picture.

7. The apparatus of claim 1 or 2, wherein the display arranges the representative pictures in the form of a circle, and rotates the representative pictures in the rotation direction of the wheel interface.

8. The apparatus of claim 7, wherein the display arranges the elemental pictures in a center of the circle of the representative pictures and similarly to the input keys.

9. The apparatus of claim 1 or 2, wherein the elemental pictures are pictures of objects associated with the representative picture to which the elemental pictures belong, or are color-changed versions of the representative picture.

10. The apparatus of claim 1 or 2, wherein the input unit is implemented as a virtual wheel interface and a virtual select button by a touch pad or a touch screen.

11. A method for inputting a graphical password in an embedded system comprising a wheel interface, a select button having M input keys, and a display, the method comprising the steps of:

(a) displaying L representative pictures, and elemental pictures corresponding to the input keys of the select button on the display;

(b1) selecting one of the representative pictures according to an input from the wheel interface;

(b2) displaying elemental pictures which belong to the selected representative picture;

(c) recognizing, when one of the input keys of the select button is pressed, that the elemental picture corresponding to the input key is input; and (d) determining, when N elemental pictures are input through repetition of steps (a) to (c), whether the input elemental pictures match the stored graphical password for user authentication.

12. A method for inputting a graphical password in an embedded system comprising a wheel interface rotatable clockwise and counterclockwise, a select button having M input keys, and a display, the method comprising the steps of:

(a) displaying L representative pictures, and elemental pictures corresponding to the input keys of the select button on the display;

(b1) displaying a rotation direction of the wheel interface on the display and selecting one of the representative pictures in response to an input from the wheel interface;

(b2) displaying elemental pictures which belong to the selected representative picture;

(c) recognizing, when one of the input keys of the select button is pressed, that a combination of the elemental picture corresponding to the input key and the rotation direction is input; and (d) determining, when N combinations are input through repetition of steps (a) to (c), whether the combinations match the stored graphical password for user authentication.

13. A method for inputting a graphical password in an embedded system comprising a wheel interface, a select button having at least one input key and one confirm key, and a display, the method comprising the steps of:

(a) displaying L representative pictures, and elemental pictures corresponding to the input keys of the select button on the display;

(b1) selecting one of the representative pictures in response to an input from the wheel interface;

(b2) displaying elemental pictures which belong to the selected representative picture;

(c) recognizing, when one of the input keys of the select button is pressed, that the elemental picture corresponding to the input key is input as one digit of the password; and (d) repeatedly performing steps (a) to (c) and determining, when the confirm key is pressed, whether the input password matches the stored graphical password for user authentication.

14. A method for inputting a graphical password in an embedded system comprising a wheel interface rotatable clockwise and counterclockwise, a select button having at least one input key and one confirm key, and a display, the method comprising the steps of:

(a) displaying L representative pictures, and elemental pictures corresponding to the input keys of the select button on the display;

(b1) displaying a rotation direction of the wheel interface on the display and selecting one of the representative pictures in response to an input from the wheel interface;

(b2) displaying elemental pictures which belong to the selected representative picture;

(c) recognizing, when one of the input keys of the select button is pressed, that a combination of the elemental picture corresponding to the input key and the rotation direction is input as one digit of the password; and (d) repeatedly performing steps (a) to (c) and determining, when the confirm key is pressed, whether the input password matches the stored graphical password for user authentication.

* * * * *